United States Patent [19]

Goodrich, Jr. et al.

[11] Patent Number: 5,046,574
[45] Date of Patent: Sep. 10, 1991

[54] AUTOMOTIVE POWER STEERING GEAR

[75] Inventors: Stanley R. Goodrich, Jr., Reese; Michael C. Melvin, Freeland, both of Mich.

[73] Assignee: General Motors Corporation, Detroit, Mich.

[21] Appl. No.: 538,440

[22] Filed: Jun. 15, 1990

[51] Int. Cl.⁵ .............................................. B62D 5/083
[52] U.S. Cl. .................................. 180/143; 180/149; 91/375 A
[58] Field of Search .............. 91/375 A; 180/132, 141, 180/142, 143, 149

[56] References Cited

U.S. PATENT DOCUMENTS

| | | | |
|---|---|---|---|
| 3,787,136 | 1/1974 | Steiner | 192/56 R |
| 4,034,825 | 7/1977 | Adams | 91/375 A |
| 4,381,698 | 5/1983 | Hasegawa et al. | 91/382 |
| 4,381,799 | 5/1983 | Sato et al. | 137/625 |
| 4,465,101 | 8/1984 | Hasegawa | 137/625 |
| 4,759,420 | 7/1988 | Schipper, Jr. et al. | 180/143 |
| 4,774,847 | 10/1988 | Breitweg | 74/388 |
| 4,793,433 | 12/1988 | Emori et al. | 180/143 |
| 4,819,545 | 4/1989 | Dymond | 91/371 |

FOREIGN PATENT DOCUMENTS

| | | |
|---|---|---|
| 60-137673 | 9/1985 | Japan . |
| 61-48812 | 4/1986 | Japan . |
| 61-155065 | 7/1986 | Japan . |
| 2044697A | 3/1979 | United Kingdom . |
| 0159687 | 10/1985 | United Kingdom ................ 180/142 |

OTHER PUBLICATIONS

GB 2199-000-A Abstract Only.

Primary Examiner—Richard A. Bertsch
Assistant Examiner—Victor E. Johnson
Attorney, Agent, or Firm—Saul Schwartz

[57] ABSTRACT

An automotive power steering gear includes a stub shaft, a pinion head, a torsion bar between the stub shaft and pinion head, and a detent reaction arrangement for varying the threshold manual effort required to initiate power assist and/or for varying the relationship between manual effort and power assist. The detent reaction arrangement includes an annular flange and tubular sleeve on the pinion head, a plurality of radial sockets in the tubular sleeve, a plurality of detent elements in the sockets, a stem on the stub shaft extending into the tubular sleeve, detent grooves on the stem engaged by the detent elements, and an annular collar on the sleeve with a frustoconical wedge engaging the detent elements. A pressure chamber between the annular flange and the collar is connected to a power steering pump so that boost pressure, or a fraction thereof modulated as a function of vehicle speed, reacting against the collar increases the resistance to relative angular displacement between the stub shaft and the pinion head.

2 Claims, 1 Drawing Sheet

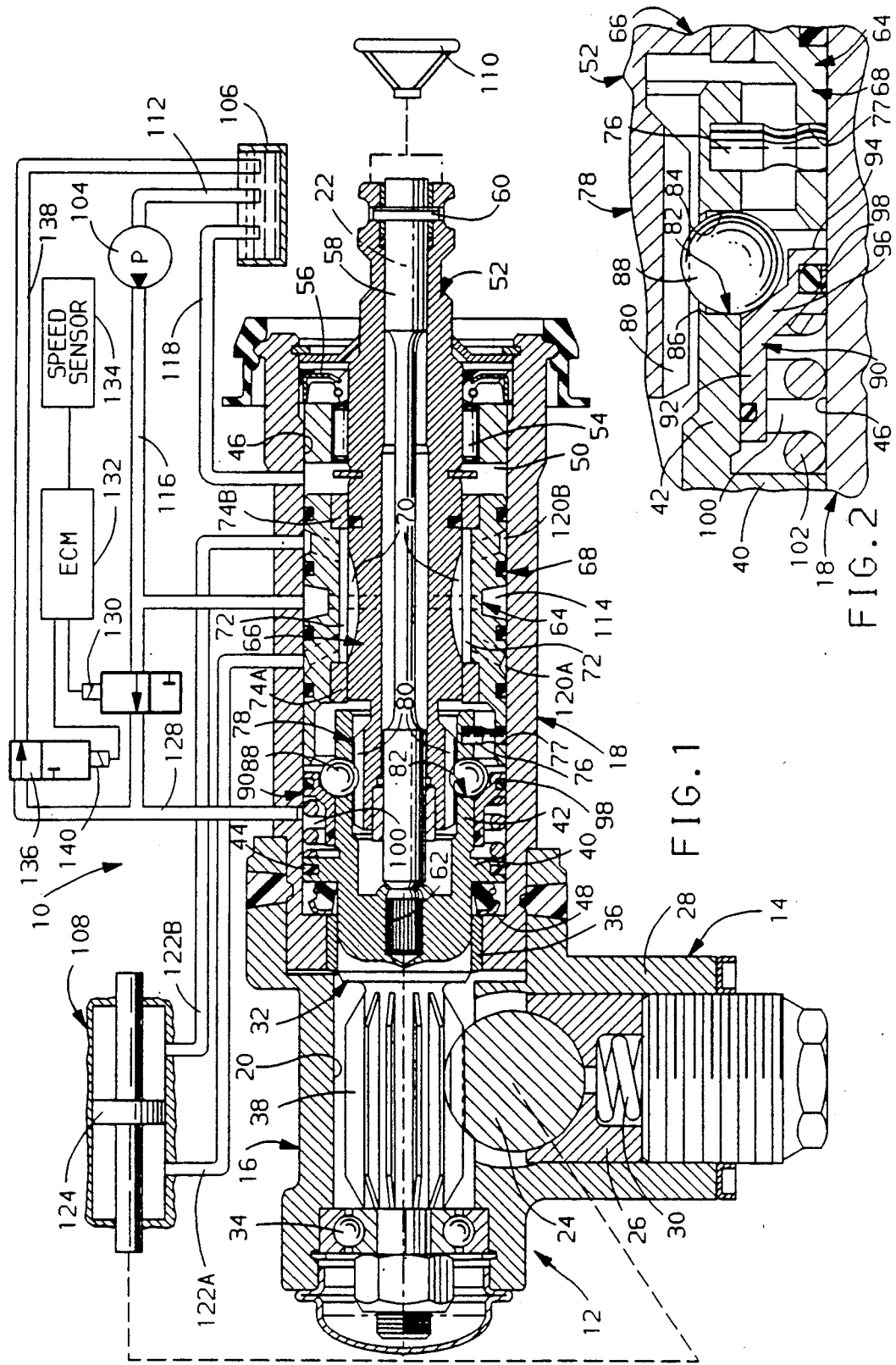

5,046,574

AUTOMOTIVE POWER STEERING GEAR

FIELD OF THE INVENTION

This invention relates to variable effort automotive power steering gears.

BACKGROUND OF THE INVENTION

In typical automotive power steering gears, a threshold manual effort level required to initiate power assist and the relationship between power assist and manual steering effort above the threshold effort level are determined by a resilient element such as a torsion bar disposed between an input shaft of the steering gear and an output shaft of the steering gear. When a driver turns a steering wheel connected to the input shaft, the torsion bar twists and relative angular displacement is effected between a valve spool connected to the input shaft and a valve sleeve connected to the output shaft. The relative movement of the valve elements ports pump boost pressure to a steering assist fluid motor. With these typical power steering gears, comfortable low speed steering is assured because the spring rate of the torsion bar is relatively low and because power assist increases exponentially after the threshold effort level is achieved.

Power steering gears have been proposed in which the threshold manual effort level increases with increasing vehicle speed. For example, U.S. Pat. No. 4,765,427, issued Aug. 23, 1988 and assigned to the assignee of this invention, describes a detent reaction power steering gear wherein a detent element on the output shaft penetrates a detent groove in the input shaft with a force which depends on a fluid detent pressure behind the detent element. An auxiliary pump provides detent pressure proportional to vehicle speed so that the detent elements more forcefully resist the onset of relative angular displacement between the input and output shafts and, consequently, between the valve elements as vehicle speed increases.

Power steering gears have also been proposed in which the relationship between power assist and manual effort is more linear. For example, U.S. Pat. No. 4,768,604, issued Sept. 6, 1988 and assigned to the assignee of this invention, describes a steering system wherein high pressure fluid is bypassed from the high pressure side of a steering assist fluid motor to the low pressure side to reduce assist.

A power steering gear according to this invention has a compact and easily assembled detent reaction and a control system for the detent reaction operative to vary the relationship between manual effort and power assist above the threshold effort level.

SUMMARY OF THE INVENTION

This invention is a new and improved automotive power steering gear having a compact detent reaction. The power steering gear according to this invention includes a housing having a cylindrical valve chamber, a rotary control valve spool in the valve chamber connected to an input shaft of the steering gear, a rotary control valve sleeve in the valve chamber around the spool and connected to an output shaft of the steering gear, and a torsion bar between the input and output shafts. The output shaft has an annular flange with a sliding seal against the wall of the valve chamber and a tubular sleeve adjacent the flange and extending toward the valve sleeve. The tubular sleeve has a plurality of radial sockets in which are disposed corresponding ones of a plurality of detent elements. A stem of the valve spool extends into the tubular sleeve and has a plurality of detent grooves which are penetrated by corresponding ones of the detent elements. A collar is slidably disposed on the tubular sleeve and cooperates with the tubular sleeve, the flange and the wall of the valve chamber in defining an annular pressure chamber. A spring in the pressure chamber urges the collar axially along the tubular sleeve so that a wedge on the collar engages the detent elements and urges the detent elements radially in toward the detent grooves. A control system for the detent reaction includes a solenoid operated valve which ports power steering pump boost pressure to the pressure chamber behind the annular collar and which modulates the boost pressure in the pressure chamber as a function of vehicle speed to vary the relationship between power assist and manual effort above the threshold effort level.

BRIEF DESCRIPTION OF THE DRAWING

FIG. 1 is a longitudinal sectional view an automotive power steering gear according to this invention in a schematically illustrated power steering system; and FIG. 2 is an enlarged view of a portion of FIG. 1.

DESCRIPTION OF PREFERRED EMBODIMENT

Referring to FIG. 1, an automotive power steering system 10 includes a power steering gear 12 according to this invention. The power steering gear 12 has a housing 14 including a pinion housing portion 16 and a valve housing portion 18. The pinion housing portion has a generally cylindrical pinion bore 20 therein on a longitudinal centerline 22 of the housing 14. A steering rack 24 is supported on the pinion housing portion 16 for transverse bodily shiftable movement relative to the centerline 22. A slide bearing 26 in a boss 28 of the pinion housing portion 16 is biased by a spring 30 against the steering rack 24.

An output shaft or pinion head 32 of the steering gear 12 is supported in the pinion housing portion 16 for rotation about the centerline 22 by a ball bearing 34 and by a journal bearing 36. The pinion head has a representative pinion gear 38 thereon which meshes with rack teeth, not shown, on the steering rack 24 on the other side of the rack from the slide bearing 26. Rotation of the pinion head 32 is accompanied by the usual shifting of the steering rack relative to the housing 14.

The pinion head includes an annular flange 40 and an integral tubular sleeve 42 perpendicular to the plane of the flange and aligned on the centerline 22. A seal ring 44 on the flange 40 bears against an inside wall 46 of the valve housing portion 18 and defines a fluid seal between the wall and the flange. A secondary fluid seal 48 is disposed behind the flange 40.

The inside wall 46 of the valve housing portion 18 defines a wall of a cylindrical valve chamber 50 of the steering gear. A tubular input or stub shaft 52 of the steering gear 12 projects into the valve chamber and is supported by a bearing 54 near the outboard or right end of the valve housing portion 18 for rotation about the centerline 22 independent of the pinion head 32. A seal 56 around the stub shaft prevents fluid leakage and internal contamination.

The stub shaft 52 is connected to the pinion head 32 by a torsion bar 58 disposed inside the stub shaft. A first or outboard end of the torsion bar is pinned to the stub shaft 52 by a pin 60 for rotation as a unit therewith. A second or inboard end of the torsion bar is press fitted into a bore 62 in the pinion head 32 inside the tubular sleeve 42 and is rotatable as a unit with the pinion head.

An open-center rotary control valve 64 of the steering gear 12 is disposed in the valve chamber 50 in axially spaced relation to the annular flange 40 on the pinion head 32. The rotary valve is conventional and may be as described in U.S. Pat. No. 3,022,772, issued Feb. 27, 1962 to Zeigler et al and assigned to the assignee of this invention. Generally, the valve 64 includes a valve spool 66 formed integrally with the stub shaft 52 on an outside surface thereof and a valve sleeve 68 surrounding the spool.

The valve spool 66 includes a plurality of arc-shaped slots 70 in the stub shaft which face outwardly toward a corresponding plurality of grooves 72 in the valve sleeve 68 between a pair of rings 74A-B on the sleeve. In addition to closing the ends of some of the grooves 72, the rings 74A-B also journal the valve sleeve on the stub shaft for independent rotation relative thereto about the centerline 22. A radially directed pin 76 rigidly attached to the tubular sleeve 42 on the pinion head 32 is closely received in a radial hole 77, FIG. 2, in a portion of the valve sleeve 68 overlapping the tubular sleeve so that the pinion head and valve sleeve are rotatable as a unit about the centerline 22.

The inboard end of the stub shaft 52 defines a tubular stem 78 integral with the valve spool 66. The stem projects into the tubular sleeve 42 on the pinion head 32 and has a plurality of generally V-shaped detent grooves 80 therein extending axially from the inboard end of the stub shaft toward the valve spool. The tubular sleeve 42 may have internal spline-like teeth, not shown, loosely received in corresponding ones of the detent grooves 80 to define a positive connection between the stub shaft and pinion head after a predetermined amount of torsion bar twist.

As seen best in FIG. 2, a plurality of radially oriented sockets 82 are formed in the tubular sleeve 42 around the stem 78. Each socket 82 is circular in cross-section and aligned with a corresponding one of the detent grooves 80 in the stem 78. Each socket 82 has a cylindrical wall 84 and an annular lip 86 around its radially inner edge. Respective ones of a plurality of spherical detent elements 88 are disposed in the sockets 82 for radial movement relative to the centerline 22. There is clearance between the detent elements and the cylindrical walls 84 to minimize resistance to radial movement of the elements. The diameters of the lips 86 are smaller than the diameters of the detent elements to foreclose inward dislodgment of the detent elements from the sockets 82.

An annular collar 90 of the steering gear 12 is disposed around the tubular sleeve 42 between the annular flange 40 on the pinion head and the valve sleeve 68. The collar 90 includes a tubular skirt 92 closely received on and slidable relative to the tubular sleeve 42, an annular boss 94, and a frustoconical shoulder or wedge 96. A seal ring 98 on the boss 94 defines a fluid seal at the interface between the annular boss and the inside wall 46 of the valve housing portion 18. The collar 90 cooperates with the annular flange 40 and the tubular sleeve 42 on the pinion head and with the inside wall 46 of the valve housing portion 18 in defining an annular detent pressure chamber 100. A spring 102 in the detent pressure chamber 100 urges the collar toward the valve sleeve and the wedge 96 into engagement on the detent balls 88.

The annular lips 86 are important features of this invention. The pinion head 32, stub shaft 52 and rotary valve 64 are subassembled prior to installation in the housing 14. Before the pinion head is connected to the stub shaft through the torsion bar 58, the spring 102 and collar 90 are installed over the tubular sleeve 42. The collar 90 is mechanically pushed toward the annular flange 40 against the spring 102 until the sockets 82 are sufficiently exposed for insertion of the detent elements 88. When the collar is thereafter released, the spring 102 expands and forces the wedge 96 against the detent elements. The wedge urges the detent elements inward against the lips 86 which prevent dislodgment of the detent elements. The diameters of the detent elements exceed the wall thickness of the tubular sleeve 42 so that the detent elements, captured against the lips 86, operate as retainers to prevent dislodgment of the sleeve and the spring from the longitudinally outboard end of the tubular sleeve.

The inboard end of the torsion bar 58 is pressed into the bore 62 in the pinion head, the valve sleeve 68 is connected to pin 76, and the stub shaft 52 is mated with the pinion head by inserting the stem 78 into the tubular sleeve 42. The detent elements 88 intercept the detent grooves 80 in the valve stem and are cammed radially out by the grooves so that the detent elements separate from the lips 86. The detent elements, in turn, through engagement on the wedge 96, force the collar 90 toward the annular flange 40 so that the spring 102 is further compressed and each of the detent elements 88 is preloaded against a corresponding one of the detent grooves 80. Thereafter, the valve housing portion 18 is closed and pin 60 between the stub shaft and torsion bar is installed.

Referring particularly to FIG. 1, the steering system 10 further includes a conventional power steering pump 104, a fluid reservoir 106, a steering assist fluid motor 108 connected to the steering rack 24, and a driver's steering wheel 110 connected to the stub shaft 52 for rotation as a unit therewith. The pump draws fluid from the reservoir through an intake 112 and discharges fluid to a center groove 114 around the valve sleeve 68 in the valve chamber 50 through a discharge 116. A return 118 conducts fluid from the valve chamber 50 back to the reservoir 106.

A pair of fluid motor grooves 120A-B around the valve sleeve 68 on opposite sides of the center groove 114 are connected through respective ones of a pair of ducts 122A-B to a pair of working chambers of the fluid motor 108 on opposite sides of a piston 124 of the fluid motor. As described in the aforesaid U.S. Pat. No. 3,022,772, the grooves and slots 70, 72 port pump discharge or boost pressure to one of the ducts 122A-B and port the low pressure interior of the valve chamber 50 to the other of the ducts 122A-B in accordance with relative angular displacement between the stub shaft 52 and the pinion head 32. A pressure difference thus established across the piston 124 provides steering power assist. Low pressure return flow in the valve chamber 50 circulates to the reservoir through return 118.

The power steering system 10 further includes a detent pressure valve 126 in a detent pressure branch 128 which extends between the detent pressure chamber 100 and the pump discharge 116. The detent pressure valve has a first position, FIG. 1, in which detent pressure branch 128 is open and a second position, not shown, in which the detent pressure branch is blocked. When the detent pressure valve is in its second position, fluid leakage from the detent pressure chamber 100 reduces the pressure therein to about the pressure of the return flow in the valve chamber 50. A solenoid 130 actuates the detent pressure valve between its first and second positions in accordance with a schedule related to vehicle speed and established by an electronic control module (ECM) 132 connected to the solenoid 130 and to a vehicle speed sensor 134.

A detent pressure chamber exhaust valve 136 of the steering system is disposed in an exhaust branch 138 which extends from the detent pressure branch 128 downstream of the detent pressure valve 126 directly to the reservoir 106. The exhaust valve has a first position in which the exhaust branch 138 is open and a second position, not shown, in which the exhaust branch 138 is blocked. A solenoid valve 140 actuates the exhaust valve between its first and second positions in accordance with a schedule related to vehicle speed and established by the ECM 132.

In a low speed range below about 10 MPH, the ECM maintains the detent pressure valve 126 in its second position blocking the detent pressure branch 128 and the exhaust valve 136 in its first position opening or unblocking the exhaust branch 138. In a higher intermediate speed range corresponding to normal city driving, the ECM maintains the exhaust valve 136 in its second position blocking the exhaust branch 138 and establishes a duty cycle for solenoid 130 which progressively unblocks the detent pressure branch 128 as vehicle speed increases in the intermediate speed range. In a still higher high speed range corresponding to highway driving, the ECM maintains the exhaust valve 136 in its second position blocking the exhaust branch and the detent pressure valve in its first position directly connecting the detent pressure chamber 100 to pump discharge 116.

The steering gear 12 and the steering system 10 operate as follows. In the low speed range, the detent pressure chamber is exhausted directly to the reservoir through the exhaust branch 138 and the exhaust valve 136. The detent pressure branch 116 is blocked by the detent pressure valve 126. A pressure gradient exists between the cylindrical valve chamber 50 on one side of the collar 90 and the detent pressure chamber 100 on the other side of the collar due to normal system back pressure in the chamber 50. The pressure gradient forces the collar toward the flange 40 so that the detent elements 88 are effectively unloaded. Accordingly, a low speed threshold manual effort level necessary to initiate power assist is a function of essentially only the spring rate of the torsion bar 58. After the low speed threshold effort level is achieved, the additional manual effort required to steer the vehicle by sustaining or increasing the relative angular displacement between the input and output shafts does not significantly increase because boost pressure increases exponentially with increasing relative angular displacement.

In the intermediate speed range, the exhaust branch 138 is blocked and the detent pressure valve 126 progressively unblocks the detent pressure branch 116 as vehicle speed increases. An intermediate speed threshold manual effort level required to initiate power assist is higher than the low speed threshold manual effort level because the pressures on opposite sides of the collar 90 are more nearly equal, allowing the spring 102 to bias the detent elements 88 into the detent grooves 80. The intermediate speed threshold manual effort level, then, is a function of the sum of the spring rates of the torsion bar 58 and the spring 102.

After the intermediate speed threshold manual effort level is achieved, the relationship between manual effort and power assist is more linear than in the low speed range. For example, as soon as the intermediate speed threshold manual effort level is achieved and boost pressure develops in the pump discharge 116, a speed proportioned fraction of boost pressure is communicated by the detent pressure branch 128 to the detent pressure chamber 100 for reaction against the collar 90. The additional pressure in the detent pressure chamber 100 causes wedge 96 to more forcefully urge the detent elements 88 into the grooves 80 so that the detent elements more forcefully resist continued and/or increased relative angular displacement between the input and output shafts. Above the intermediate speed threshold manual effort level, then, the relationship between power assist and manual effort is more linear than in the low speed range because a driver must exert more manual effort to achieve the same level of power assist.

In the high speed range, the detent pressure branch 128 is fully and continuously unblocked. The high speed threshold manual effort level required to initiate power assist by initiating relative angular displacement between the input and output shafts is about the same as the intermediate speed threshold manual effort level. After the high speed threshold manual effort level is achieved, maximum linearity between manual effort and power assist is achieved because unreduced or unmodulated boost pressure is communicated directly to detent pressure chamber 100 for reaction against the annular collar 90.

The embodiments of the invention in which an exclusive property or privilege is claimed are defined as follows:

1. A power steering gear comprising:
    a housing having a cylindrical inside wall defining a valve chamber,
    an input shaft and an output shaft each supported on said housing for independent rotation about a centerline of said valve chamber,
    an annular flange on said output shaft having a fluid sealed sliding interface at said cylindrical inside wall,
    a pump,
    a reservoir,
    a rotary valve in said valve chamber including a valve spool rotatable with said input shaft and a valve sleeve around said valve spool longitudinally spaced from said annular flange and rotatable as a unit with said output shaft,
    first conduit means connecting a discharge of said pump to said rotary valve and said valve chamber such that when said rotary valve is in an open-center condition a substantially constant fluid back pressure develops in said valve chamber downstream of said rotary valve,
    means on one of said input shaft and said output shaft defining a tubular sleeve between said valve sleeve and said annular flange rotatable as a unit with said one of said input and said output shafts and spaced radially inboard of and cooperating with said cylindrical inside wall in defining an annular chamber between said tubular sleeve and said cylindrical inside wall, means on the other of said input shaft and said output shaft defining a stem extending inside said tubular sleeve and rotatable as a unit with said other of said input and said output shafts, means defining a plurality of radial sockets in said tubular sleeve, a plurality of spherical detent elements in respective ones of said radial sockets shiftable radially relative to said centerline, means on said stem defining a plurality of grooves engaged by said detent elements to restrict relative rotation between said input shaft and said output shaft as a function of the magnitude of inward radial forces on said detent elements, an annular collar disposed in said annular chamber and longitudinally slidable on said tubular sleeve and having a fluid sealed sliding interface at said cylindrical inside wall, means on said annular collar defining a wedge surface directly exposed to said substantially constant fluid back pressure in said valve chamber downstream from said rotary valve and engageable on said detent elements and exerting thereon inward radial forces the magnitudes of which increase as said annular collar slides longitudinally toward said valve sleeve, and conduit and control means operative in a low vehicle speed range to connect said annular chamber between said annular flange and said annular collar to said reservoir independently of said first conduit means so that said fluid back pressure in said valve chamber produces a net fluid pressure force on said annular collar away from said valve sleeve in said low vehicle speed range and in a higher vehicle speed range to connect said pump discharge to said annular chamber between said annular flange and said annular collar to substantially eliminate said net fluid pressure force on said annular collar away from said valve sleeve.

2. The power steering gear recited in claim 1 and further including a spring in said annular chamber biasing said annular collar toward said valve sleeve.

* * * * *